United States Patent

Georgopulos

[11] 3,952,906
[45] Apr. 27, 1976

[54] CASE FOR ELECTRICAL COMPONENTS
[75] Inventor: Thomas Georgopulos, Chicago, Ill.
[73] Assignee: GTE Automatic Electric Laboratories Incorporated, Northlake, Ill.
[22] Filed: Oct. 31, 1973
[21] Appl. No.: 411,583

[52] U.S. Cl. ................................ 220/18; 220/3.3; 220/23.6; 206/503; 339/128; 211/49 R; 178/46
[51] Int. Cl.² ........................................ B65D 25/24
[58] Field of Search ............... 220/18, 3.3, 3.6, 3.8, 220/3.9, 23.2, 23.4, 23.6, 23.8; 339/125 R, 128; 206/503, 504, 509, 328, 329; 211/59, 49 R; 248/127, 128; 178/46

[56] References Cited
UNITED STATES PATENTS

| | | | |
|---|---|---|---|
| 689,414 | 12/1901 | Robinson | 220/3.9 |
| 845,739 | 3/1907 | Alson | 211/49 R |
| 1,105,284 | 7/1914 | McMurtrie | 220/3.9 |
| 1,917,242 | 7/1933 | Emmons | 220/3.9 |
| 2,208,007 | 7/1940 | Maechtlen et al. | 220/3.9 |
| 2,949,192 | 8/1960 | Maliff | 211/49 R |
| 3,425,586 | 2/1969 | Petters et al. | 220/23.4 |
| 3,691,294 | 12/1972 | Charles | 178/46 |
| 3,787,801 | 1/1974 | Teagno et al. | 339/125 R |

FOREIGN PATENTS OR APPLICATIONS
643,965   11/1960   Italy .................................. 339/128

Primary Examiner—William Price
Assistant Examiner—Joseph M. Moy
Attorney, Agent, or Firm—David W. Heid

[57] ABSTRACT

A case for electrical components is disclosed in which a pair of arms extend outward from the annular wall of the case, the arms being flexible and adapted to allow the case to be attached to a mounting member having spaced apart edges by pressing the free ends of the arms against the spaced apart edges where upon the flexible arms move outward and allow the case to be snapped onto the mounting member.

5 Claims, 3 Drawing Figures

CASE FOR ELECTRICAL COMPONENTS

BACKGROUND OF THE INVENTION

This invention relates generally to an improved case for an electrical component and more particularly to an improved case which may be advantageously used to hold a loading coil utilized in the field of telephony.

To improve the electrical characteristics of cables such as voice frequency cables used in telephone communication systems, the cables are typically spliced at selected intervals and electrical components such as loading coils inserted into the cable. These components may be typically located in an access enclosure at which the cables are terminated. It is not uncommon that the loading coils may be either replaced or additional coils added to the enclosure and hence it is desirable to provide loading coils in a case which may be easily installed and removed from the enclosure. It is also highly desirable to provide a case which may be installed or removed without interfering with other cases which are also included in the enclosure. U.S. Pat. No. 3,719,272 issued to Norman R. Bodine and David C. Noetzelmann on Mar. 6, 1973, illustrates interlocking cases for electrical components such as loading coils. These cases are designed such that a plurality of them may be interlocked to form a stack thereof. Each of the cases include a pair of converging extensions extending from the wall of the case to provide a vertical groove for fastening an individual case of a stack of cases to a support which is not illustrated. With a stack of cases as illustrated in the Bodine patent, if it becomes necessary to replace a case which is interior of the stack, the case to be replaced must be rotated with respect to both the case above and below it. This of course may present some problems if the stack of cases is attached to a support means since the one to be removed and all of those cases above it must be moved to a position in which they are free to be rotated so that they can be unlocked from the case to be replaced.

SUMMARY OF THE INVENTION

In the present invention a unique case is provided for electrical components. The case includes a mounting arrangement which permits the case to be installed or removed from a mounting standard without disturbing other cases which are mounted on the standard. By utilizing the case of the present invention, a plurality of cases may be stacked adjacent to one another on a mounting standard and if necessary a case within the stack may be removed and another installed in its place without disturbing the other cases. Since in the environment in which this case may be utilized a number of electrical leads extending from the cases may be wired to a cable terminating in the enclosure, it is desirable to not have to disconnect the wires of the cases not being installed or removed in order to replace a case.

Another advantage of cases of the present invention permits the cases to be stacked on opposite sides of the mounting member and hence increase the number of cases within a given unit height.

DESCRIPTION OF THE PREFERRED EMBODIMENT

Figure 1:
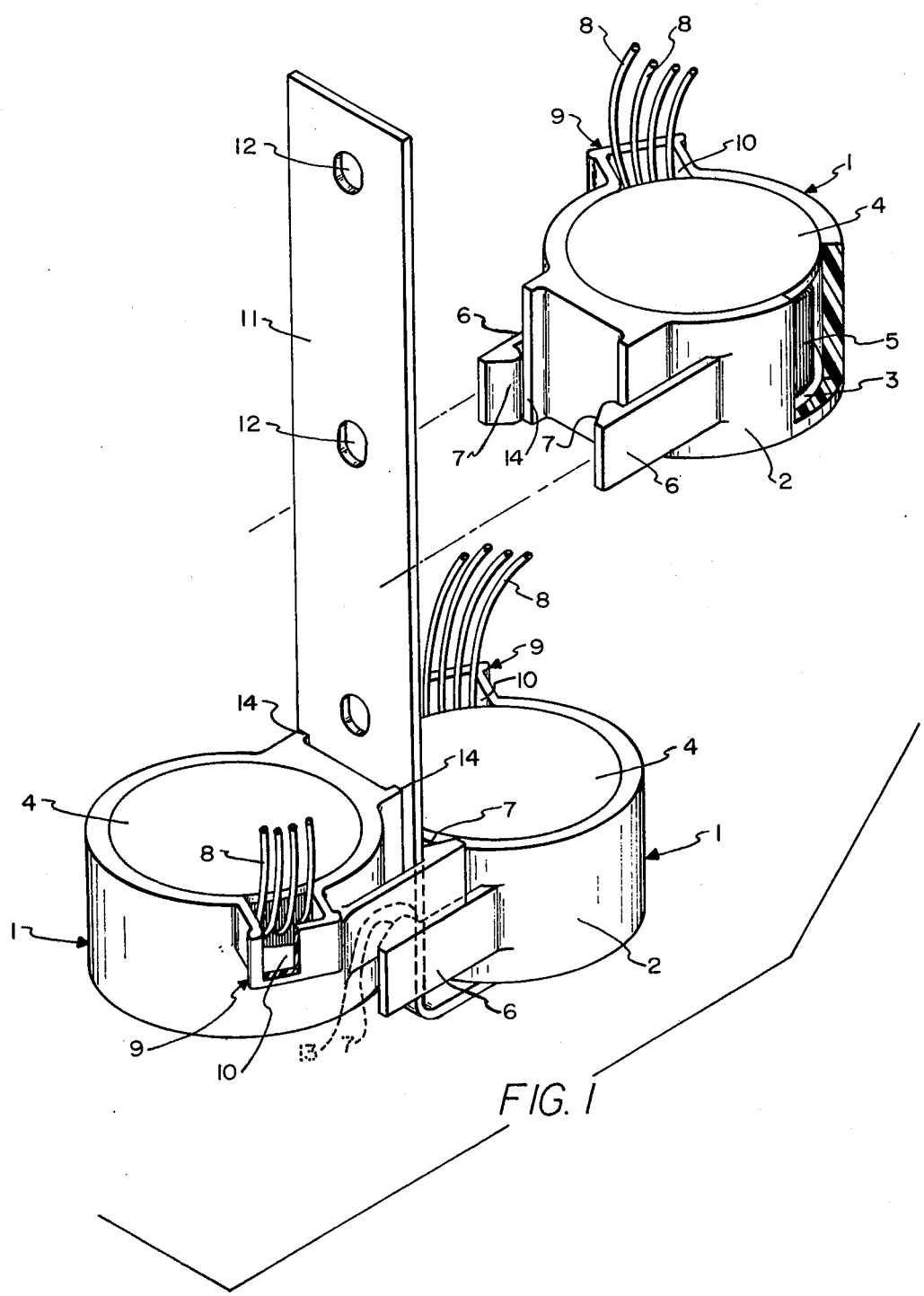
FIG. 1 is a perspective view of three cases in accordance with the present invention, two of the cases being shown mounted on a mounting standard.

Now referring to FIG. 1, there is illustrated in perspective view three cases 1 in accordance with the present invention. In the upper right hand portion of the drawing, case 1 is illustrated with a portion of the annular side wall 2 cut away to illustrate the thickness of the side wall and also the thickness of floor 3. The lower portion of case 1 is generally cup-shaped, having annular side wall 2 extending upward from floor 3. Case 1 also includes a top or cover 4 which is used to enclose an electrical component, which may be for example a loading coil 5 as illustrated in FIG. 1. The lower portion of case 1 is preferably molded in a single piece and includes as an integral part thereof and extending from annular side wall 2 a pair of arms 6. Included on the free ends of arms 6 are curved portions 7, the function of which will be described subsequently. Electrical leads 8, which are connected to loading coil 5, extend outward from the interior of case 1 via well portion 9 which is molded as a part of the annular side wall 2. It will be noted that the top or cover 4 is of a thickness which is much less than the depth of well portion 9 and hence electrical leads 8 which extend downward through well portion 9 may extend underneath top 4 and hence be connected to loading coil 5 without interference with top 4. A better appreciation of the interior of well portion 9 will be obtained by referring to case 1 in the lower left hand portion of FIG. 1 wherein part of well portion 9 has been cut away. Also clearly illustrated in this area of FIG. 1 is how electrical leads 8 enter case 1 via well 9. In constructing the overall assembly including case 1 and loading coil 5, the preferred method is to place loading coil 5 into case 1, extend leads 8 out of the case via well portion 9, press the top 4 into the upper portion of case 1 and then pour an encapsulating material into the open portion 10 of well 9 to fill the interior of case 1 with the encapsulating material up to the upper level of open portion 10 and hence hermetically seal the loading coil 5 in case 1.

It will be noted in FIG. 1 that mounting standard 11 is generally L-shaped with the lower portion of the L extending below the first case 1 of the two cases which are stacked on mounting standard 11. The lower portion of the L of course prevents the case adjacent thereto from sliding further downward. Mounting standard 11 also includes apertures 12 which may be employed to mount standard 11 on a supporting surface. The cases 1 may be attached to mounting standard 11 by pressing curved portion 7 of arms 6 against the opposite edges of mounting standard 11, curved portions 7 of arms 6 serving to cam arms 6 outward so that arms 6 will flex and allow the free ends of the arms to pass over the edges of mounting standard 11, with this flexing action of arms 6, case 1 may be installed or removed by merely pushing it inward towards the mounting standard 11 or pulling it outward away from the mounting standard. Once case 1 has been pressed onto mounting standard 11 and curved portion 7 has passed over the opposite edges of mounting standard 11, arms 6 will return to their original position. Case 1 is now held in place on the mounting standard since case 1 will be held between inner edge 13 of curved portion 7 and the fre ends of spacer ribs 14 which are integral with, and extend outward from annular side wall 2.

One of the principal advantages of case 1 is exhibited in FIG. 1, wherein it will be noted that since the height of arm 6 is less than that of the annular wall 2, cases 1 may be stacked on opposite sides of the mounting standard 11 and hence two of the cases employ only slightly more vertical height than a single case. With the height of arm 6 being a fraction of the overall height of case 1, arms 6 may be interleaved and hence allow a greater number of cases to be stacked in a given amount of vertical height. It should also be noted that with the mounting arrangement in the present invention, cases 1 may be snapped onto mounting standard 11 such that leads 8 extend either upward or downward with respect to mounting standard 11. Also, when the cases are stacked on the opposite sides of the mounting standard 11 as illustrated in FIG. 1, they may be snapped into place on the standard such that all leads 8 come out facing either toward one edge of the mounting standard or the other, which may be desirable in the situation in which one edge of mounting standard 11 is relatively close to the support means for mounting standard 11.

Figure 2:
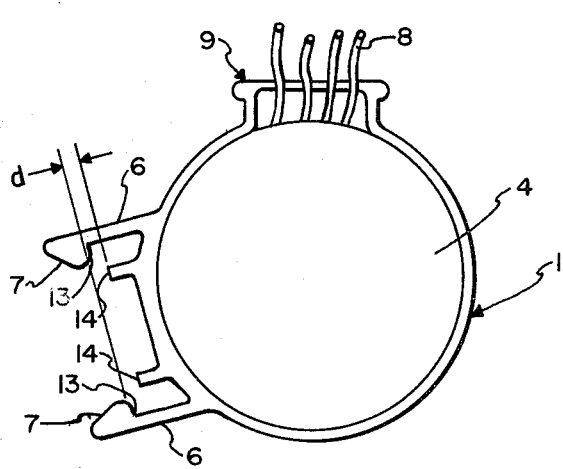
FIG. 2 is a top plan view of a case constructed in accordance with the present invention.

To better appreciate the configuration of arm 6, your attention is directed to FIG. 2 wherein case 1 is shown in a top plan view. It will be noted that curved portions 7 are angled such that when they are pressed against the opposite edges of mounting standard 11 they force the arm 6 to flex outward so that the free ends of arm 6 can pass over the edges of mounting standard 11. Once this has occured, mounting standard 11 will be positioned between the inner edges 13 of arms 6 and the free ends of spacer ribs 14. Hence to form a reasonably tight fit between case 1 and mounting standard 11, the distance $d$ between the inner edges 13 of arms 6 and the free ends of spacer ribs 14 should be only slightly greater than the thickness of mounting standard 11.

Continuing to refer to FIG. 2, spacer ribs 14 have been provided in spaced apart relationship such that the free space between the ribs allows case 1 to be snapped over mounting standard 11 in a position wherein the head of a mounting bolt extends toward the case 1. Thus in a situation in which mounting standard 11 is supported by a bolt which extends through aperture 12 of mounting standard 11, case 1 may be snapped onto the mounting standard in a position directly opposite the head of the bolt with spacer ribs 14 straddling the head of the bolt. It will of course be appreciated that case 1 could be constructed without spacer ribs 14, and by making an appropriate adjustment of distance between inner edges 13 of arms 6 and annular side wall 2 to accommodate the thickness of mounting standard 11, case 1 could be supported on mounting standard 11. However, in the absence of spacer ribs 14 it would of course be impossible to mount case 1 directly over the head of a mounting bolt extending through mounting standard 11.

Figure 3:
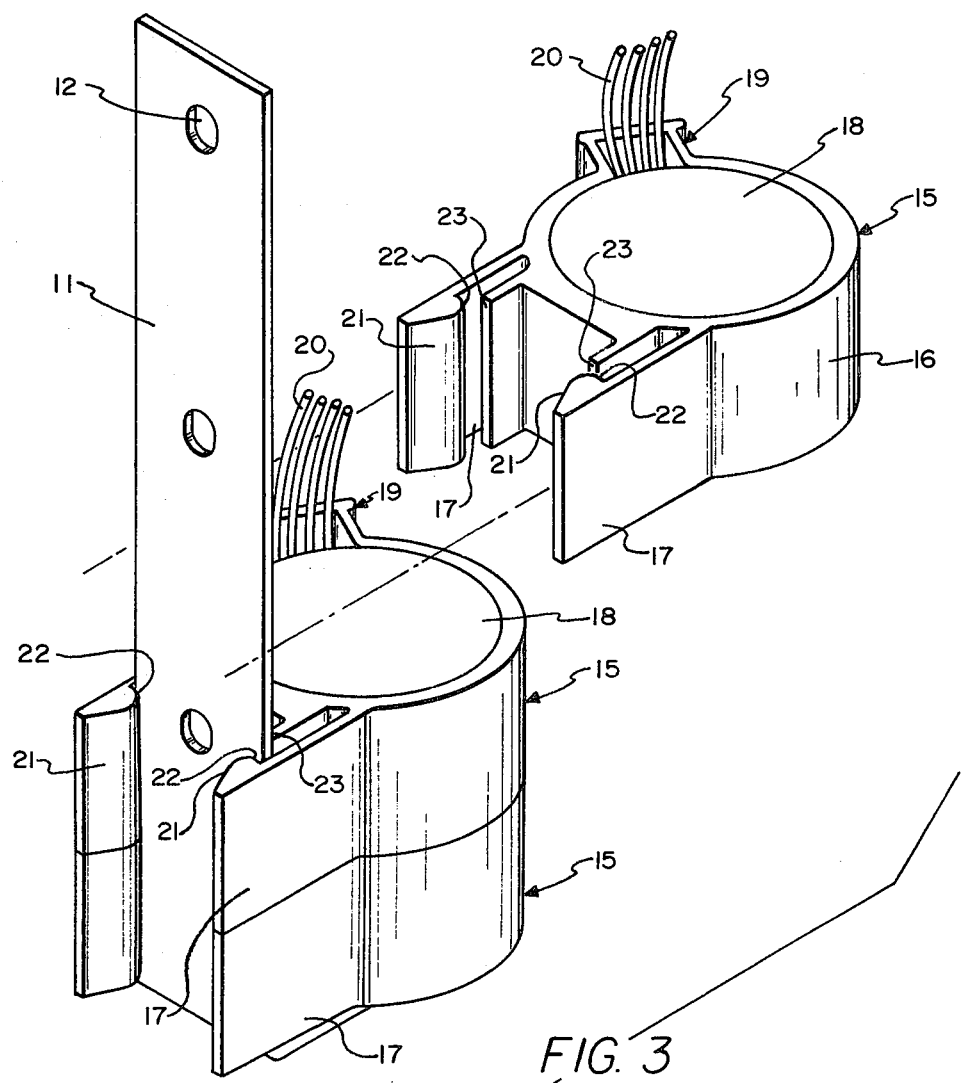
FIG. 3 is a perspective view of another embodiment of cases according to the present invention, with two of the cases mounted on the mounting means and a third illustrated spaced apart from the mounting means.

Referring to FIG. 3, there is illustrated an alternative embodiment of the present invention. Case 15 includes annular side wall 16 and a pair of flexible arms 17 which are molded as a part of the case 15. Flexible arms 17 extend the full height of the annular side wall 16 in distinction to arms 6 of case 1 which were only a fraction of the height of annular side wall 2 of case 1. Case 15 includes a top or cover 18 for enclosing an electrical component which may be included in case 15, and well portion 19, which is structured like well portion 9 of case 1, to allow egress of electrical leads 20 from case 15. The free ends of arms 17 include curved portions 21 ending in inner edges 22. Curved portions 21 and inner edges 22 of arms 17 have the same geometrical relationship as that of curved portions 7 and inner edges 13 respectively of arms 6 of case 1. Curved portions 21 and inner edges 22 allow case 15 to be installed and removed from mounting standard 11 in the same manner as was described with respect to case 1. Also included as an integral part case 15 are spacer ribs 23 which serve the same function as spacer ribs 14 of case 1. In utilizing case 15 for mounting electrical components, it will of course be appreciated that case 15 may be snapped onto mounting standard 11 such so that electrical leads 20 either face upward or downward. Since flexible arms 17 are of a height equal to that of annular side wall 16, stacking cases 15 on opposite sides of mounting standard 11 will mean that a lesser stacking density may be achieved than is possible with case 1 since cases 15 will be spaced apart by the height of flexible arms 17 and interleaving of the flexible arms as illustrated with case 1 is not possible.

It is to be understood that the embodiments shown and described herein are illustrative of the principles of this invention only, and that modifications may be implemented by those skilled in the art without departing from the spirit and scope of the invention.

What is claimed is:

1. A case for electrical components, said case being adapted to be releasably attached to a mounting standard having a pair of spaced apart edges and being of a predetermined thickness, said case comprising:

a floor;

a wall extending upward from said floor;

a spaced apart pair of flexible arms integral with and extending outward in spaced apart parallel planes from said wall, the free ends of said arms including curved, inwardly facing projections defining angled surfaces, which force said arms to flex outwardly when pressed against the edges of the support so that the free ends of said arms can pass over the edges of the support, and inner edges which engage and capture the mounting support between said arms; and a pair of spacer ribs positioned between said arms and extending outward from said wall in spaced apart parallel planes so as to provide a free space between them for receiving therein fastening means, the length of said pair of spacer ribs being proportioned so that the distance between the terminal ends thereof and said inner edges of said arms is only slightly greater than the thickness of the mounting support to thereby form a reasonably tight fit between said case and the mounting support, said case being attached to said mounting standard by pressing the angled surfaces on said free ends of said arms against said spaced apart edges of the mounting standard to thereby cause said arms to flex outward to pass said projections over said edges and behind the mounting standard to capture the mounting standard between the terminal ends of said spacer ribs and said inner edges of said projections, the free space between said spacer ribs permitting said case to be attached to the mounting standard directly opposite fastening means with said spacer means straddling the fastening means.

2. The case as claimed in claim 1 wherein said wall includes a well portion integral with said wall extending exterior to said wall.

3. The case as claimed in claim 1 wherein:
said arms are of substantially less height than said wall;
whereby said cases may be interleavingly stacked on opposite sides of said standard with an economical use of space.

4. A case as claimed in claim 2 wherein:
said well is of substantially less height than said wall.

5. A case as claimed in claim 4 wherein:
said arms are of substantially less height than said wall;
whereby said cases may be interleavingly stacked on opposite sides of said standard with an economical use of space.

* * * * *